(12) United States Patent  
Tang (10) Patent No.: US 8,371,878 B2
(45) Date of Patent: Feb. 12, 2013

(54) CHIP CARD HOLDING MECHANISM AND PORTABLE ELECTRONIC DEVICE USING SAME

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 92 days.

(21) Appl. No.: 13/171,697

(22) Filed: Jun. 29, 2011

(65) Prior Publication Data

US 2012/0134083 A1   May 31, 2012

(51) Int. Cl.
*H01R 24/00* (2011.01)
(52) U.S. Cl. ........................................ 439/630
(58) Field of Classification Search .......... 439/630, 439/131, 157, 372
See application file for complete search history.

(56) References Cited

U.S. PATENT DOCUMENTS

| 7,362,309 | B2 * | 4/2008 | Chao et al. | 345/164 |
| 7,443,382 | B2 * | 10/2008 | Koo et al. | 345/163 |
| 7,821,497 | B2 * | 10/2010 | Chu et al. | 345/163 |
| 7,857,659 | B2 * | 12/2010 | Wang et al. | 439/501 |
| 2008/0227380 | A1 * | 9/2008 | Hsu et al. | 454/184 |

* cited by examiner

*Primary Examiner* — Tulsidas C Patel
*Assistant Examiner* — Phuongchi Nguyen
(74) *Attorney, Agent, or Firm* — Altis Law Group, Inc.

(57) ABSTRACT

A chip card holding mechanism includes a support bracket, a tray, one or more resilient members and a latching assembly. The support bracket defines a receiving space with an opening. The resilient member is fixed in the support bracket. The tray defines a rectangular groove to receive a chip card. The tray is slidably mounted to the support bracket via the opening, received in the receiving space engageably by the latching assembly and resisting the resilient member.

20 Claims, 7 Drawing Sheets

CHIP CARD HOLDING MECHANISM AND PORTABLE ELECTRONIC DEVICE USING SAME

BACKGROUND

1. Technical Field

The present disclosure relates to holding mechanisms, particularly to a chip card holding mechanism for a portable electronic device.

2. Description of Related Art

Portable electronic devices such as mobile phones typically have at least one chip card (e.g., SIM card) for storing usable information. It is necessary to provide a chip card holding mechanism for holding/securing the chip card within the portable electronic device. The chip card holding mechanism usually defines a receiving space, an elastic sheet fitted in the receiving space, and a holding member rotatably assembled on the housing of the portable electronic device. The chip card can be received and can be held in the receiving space by the holding member, with the chip card resisting the elastic sheet. When the chip card is to be released from the chip card holding mechanism, a user just needs to push it so it can rotate the holding member. However, the chip card holding mechanism, may not unlock if the pressure of the push is not strong enough to rotate the holding member, on the other hand, too much pressure on the cover may cause damage.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of chip card holding mechanism and portable electronic device using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
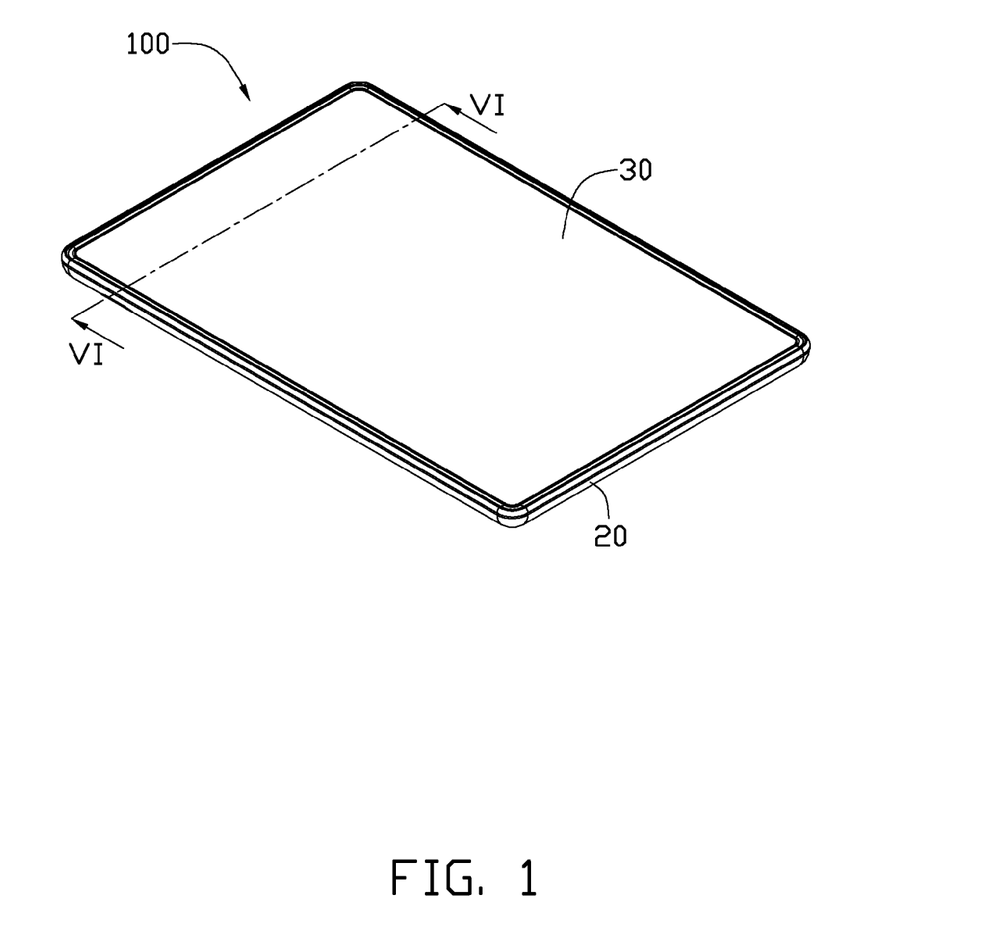
FIG. 1 is a partial, isometric view of an embodiment of a portable electronic device; the portable electronic device includes a chip card holding mechanism.
Figure 2:
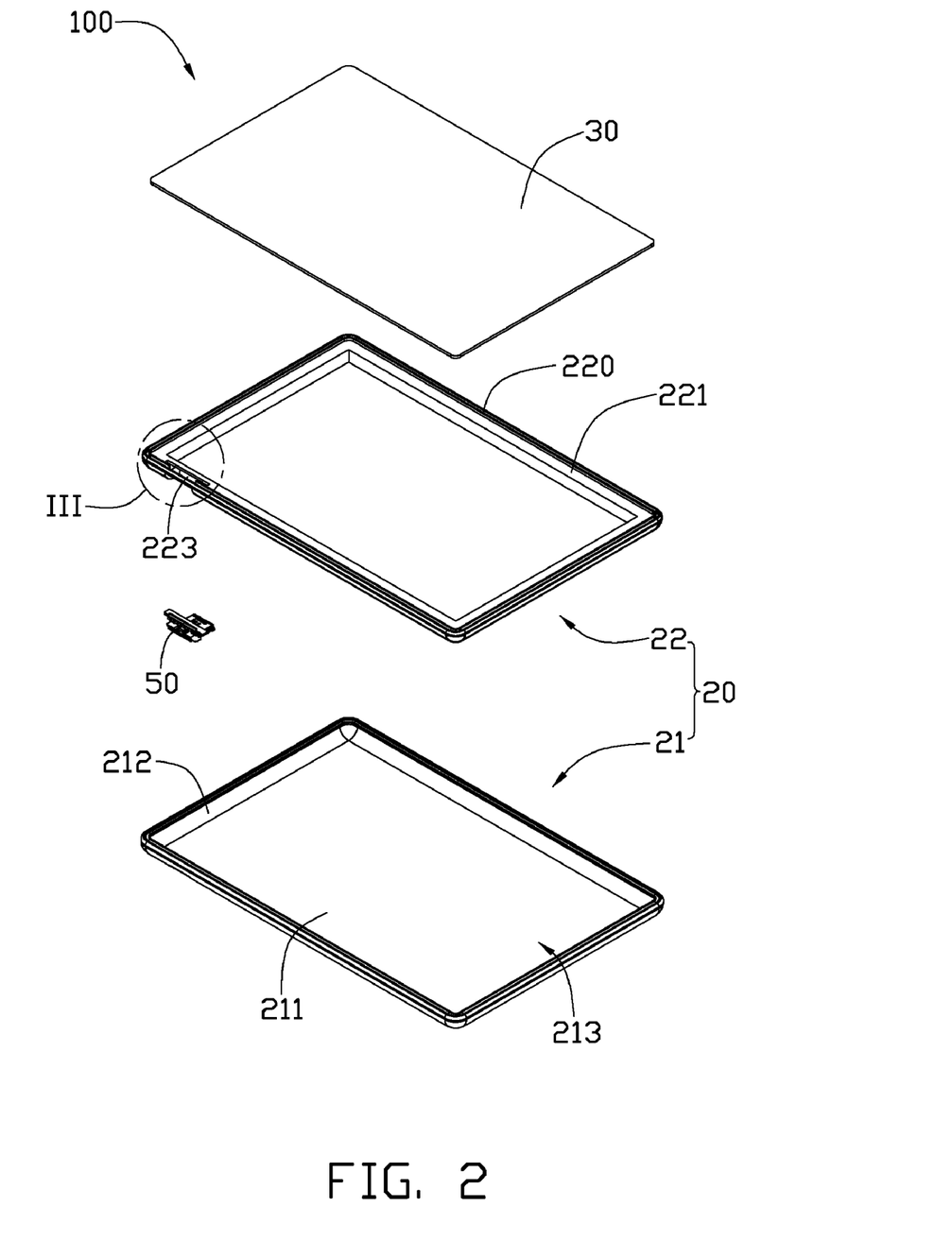
FIG. 2 is an exploded, isometric view of the portable electronic device of FIG. 1.

Referring to FIGS. 1 and 2, an embodiment of a portable electronic device 100 includes a housing 20, a liquid crystal display (LCD) panel 30, a chip card 40, and a chip card holding mechanism 50. The LCD panel 30 is fixed on the housing 20. The holding mechanism 50 is received in the housing 20. The chip card 40 is detachably received in the holding mechanism 50. The portable electronic device 100 may be a notebook computer, a mobile phone, a tablet computer or other electronic devices. The chip card 40 may be one of various types of cards such as SD Card, multimedia card (MMC Card) or SIM Card. In the illustrated embodiment, the electronic device 100 is a tablet computer, and the chip card 40 is a SIM card.

Figure 3:
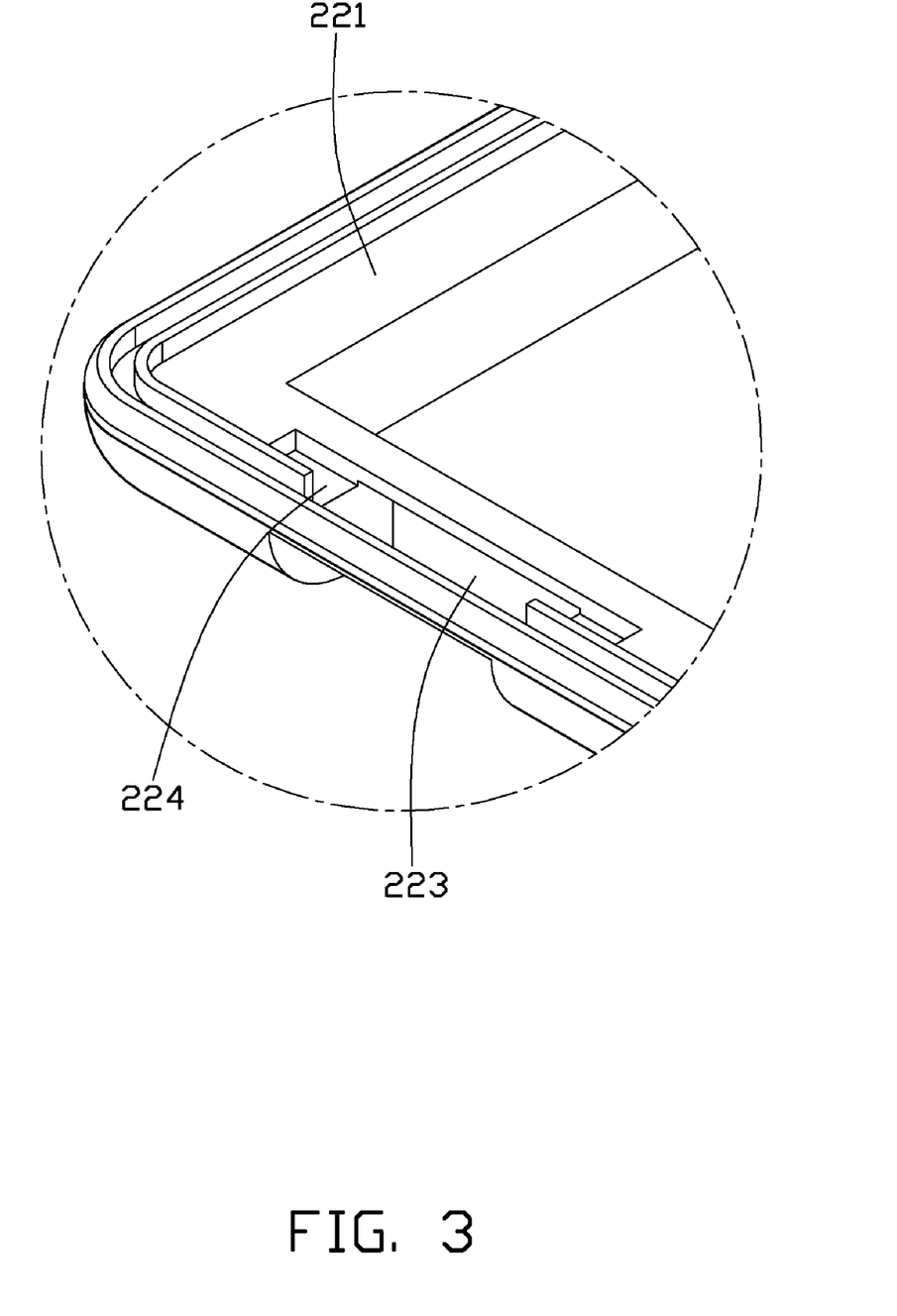
FIG. 3 is an enlarged view of a circled portion III of FIG. 2.
Figure 7:
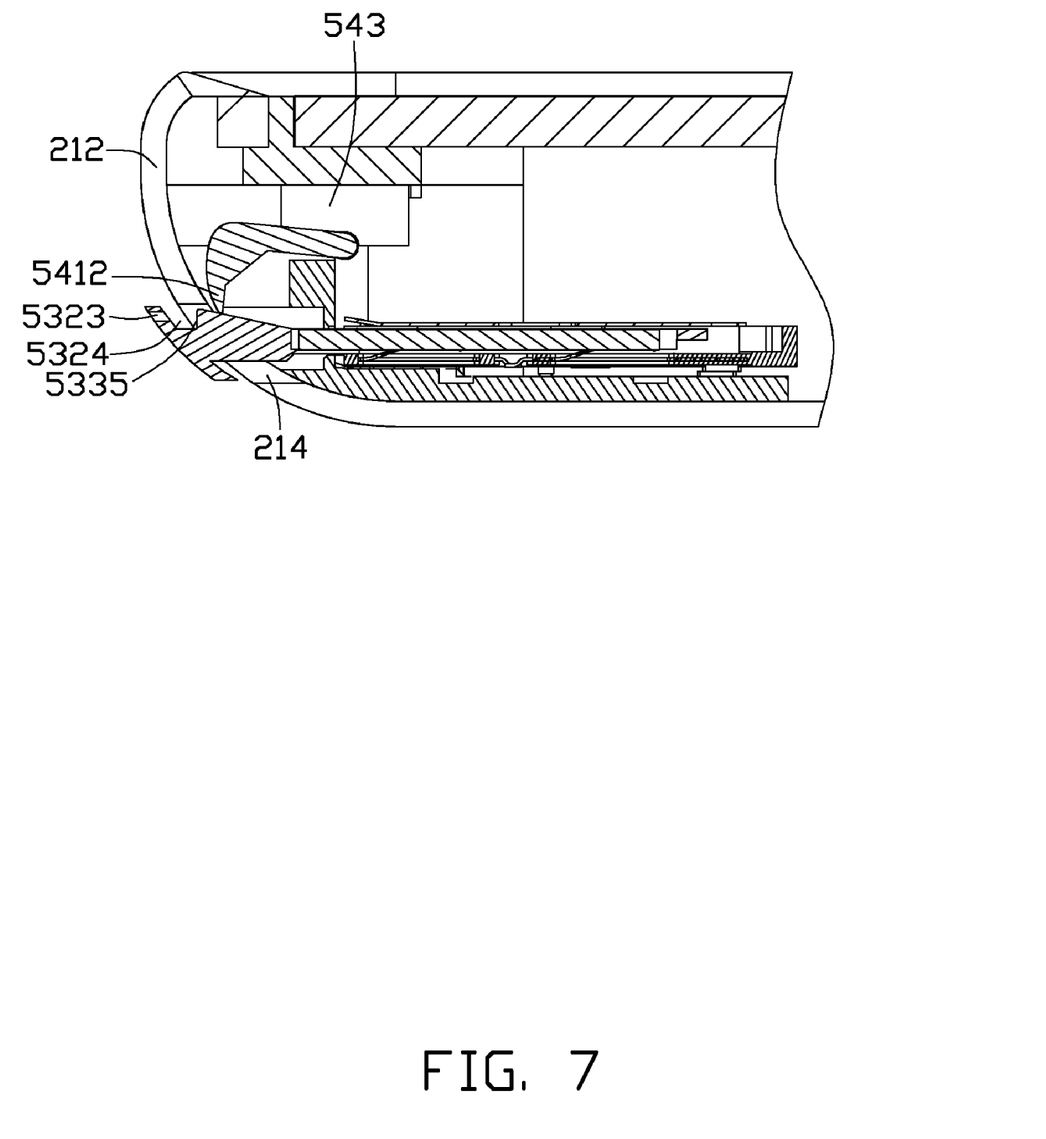
FIG. 7 is similar to FIG. 6, but showing the portable electronic device in another operating state.

Referring also to FIG. 3, the housing 20 includes a bottom housing 21 and a supporting member 22. The bottom housing 21 includes a bottom plate 211 and four side walls 212 extending upward from four edges of the bottom plate 211. The bottom plate 211 is substantially a rectangular sheet. The bottom plate 211 and the four side walls 212 cooperatively define a receiving space 213 to receive the holding mechanism 50 and other electronic components. One of the side walls 212 defines an arcuate insertion opening 214 (see FIG. 7) adjacent to the bottom plate 211 to allow the chip card 40 to pass through.

The supporting member 22 is substantially rectangular, and includes four side walls 220 connecting in order. The supporting member 22 is fixed on the bottom housing 21. The supporting member 22 further includes a first stepped surface 221 depressed in a top surface of the four side walls 220 apart from the bottom housing 21. In the illustrated embodiment, the LCD panel 30 is adhered on the first stepped surface 221. The first stepped surface 221 defines a rectangular stepped hole 223 corresponding to the insertion opening 214. A second stepped surface 224 is depressed in an end of the side walls of the stepped hole 223 apart from the bottom housing 21 to fix the holding mechanism 50.

Figure 4:
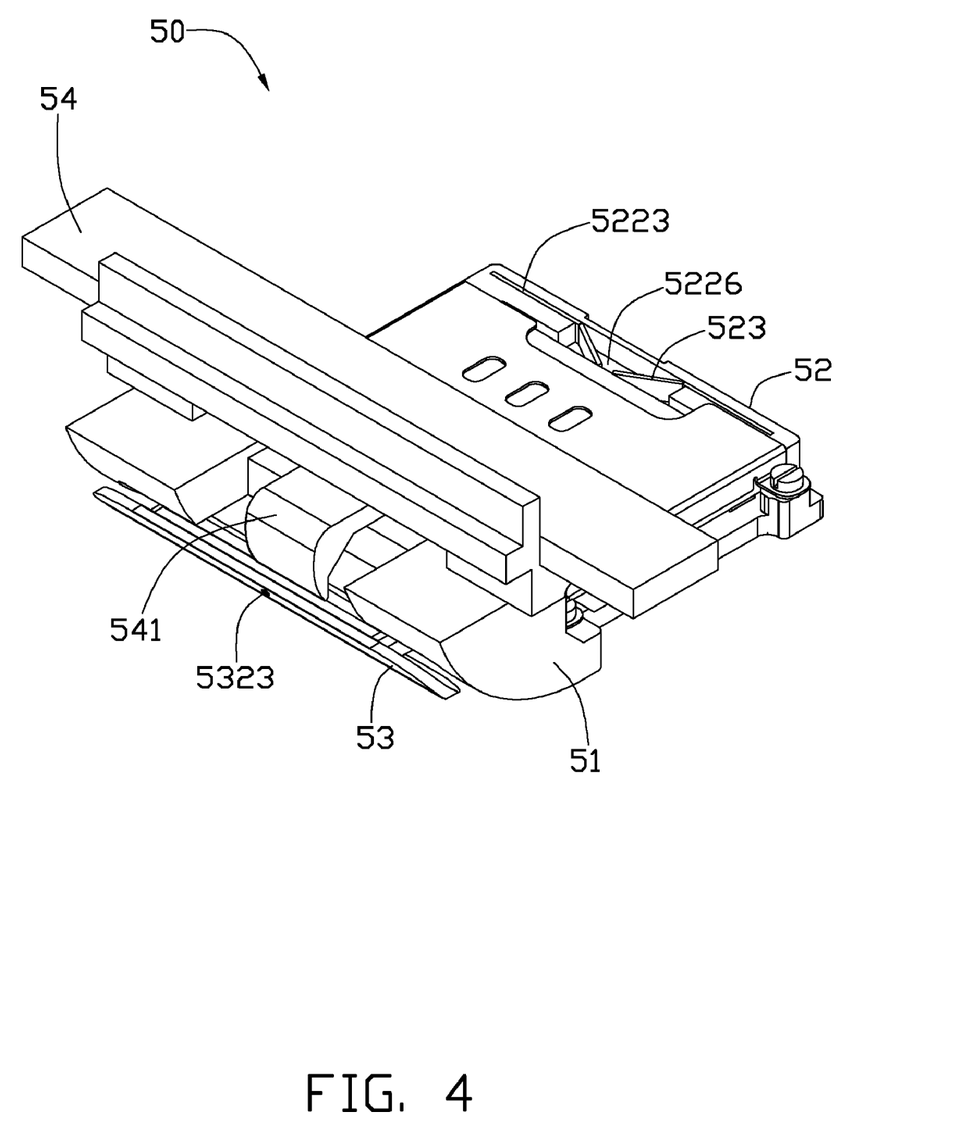
FIG. 4 is an enlarged, isometric view of the chip card holding mechanism of FIG. 2.
Figure 5:
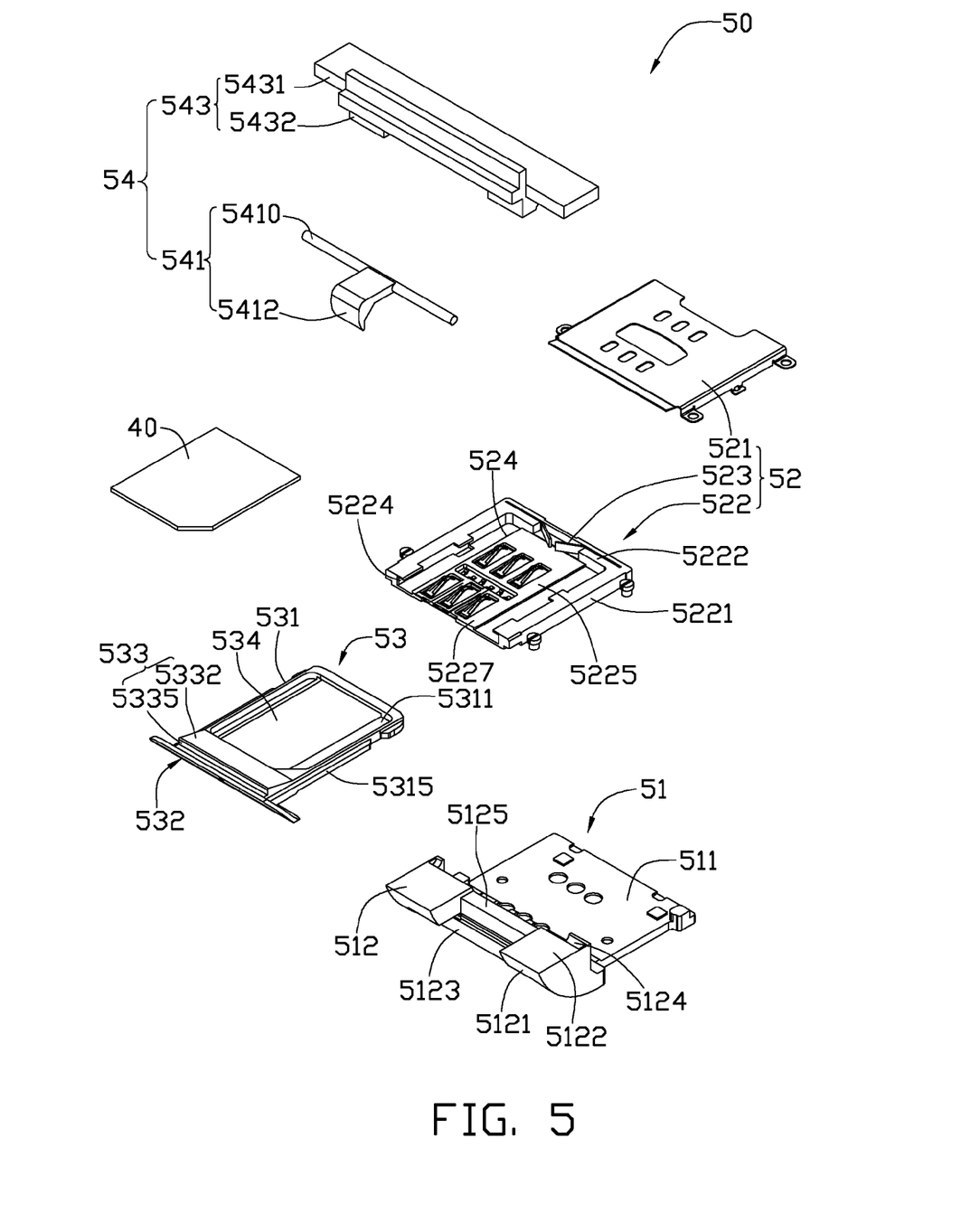
FIG. 5 is an exploded, isometric view of the chip card holding mechanism of FIG. 4.

Referring to FIG. 4 and FIG. 5, the holding mechanism 50 includes a base seat 51, a support bracket 52, a tray 53, and a latching assembly 54. The base seat 51 is fixed on the bottom housing 21 adjacent to the insertion opening 214. In the illustrated embodiment, the base seat 51 is adhered to the side wall 212 with adhesive. The base seat 51 includes a main body 511 and an enlarged end 512 at an end of the main body 511 adjacent to the insertion opening 214. The main body 511 is substantially flat to support the support bracket 52. The enlarged end 512 includes an arcuate side surface 5121 and a planar top surface 5122 parallel with the main body 511. The side surface 5121 is connected with the top surface 5122. The side surface 5121 defines an engaging hole 5123 adjacent to the main body 511 corresponding to the insertion opening 214. The top surface 5122 defines an arcuate groove 5124 in an end of the top surface 5122 adjacent to the main body 511 to fix the latching assembly 54. A restriction surface 5125 is formed in the middle portion of the top surface 5122 to stop the rotation of the latching assembly 54.

Figure 6:
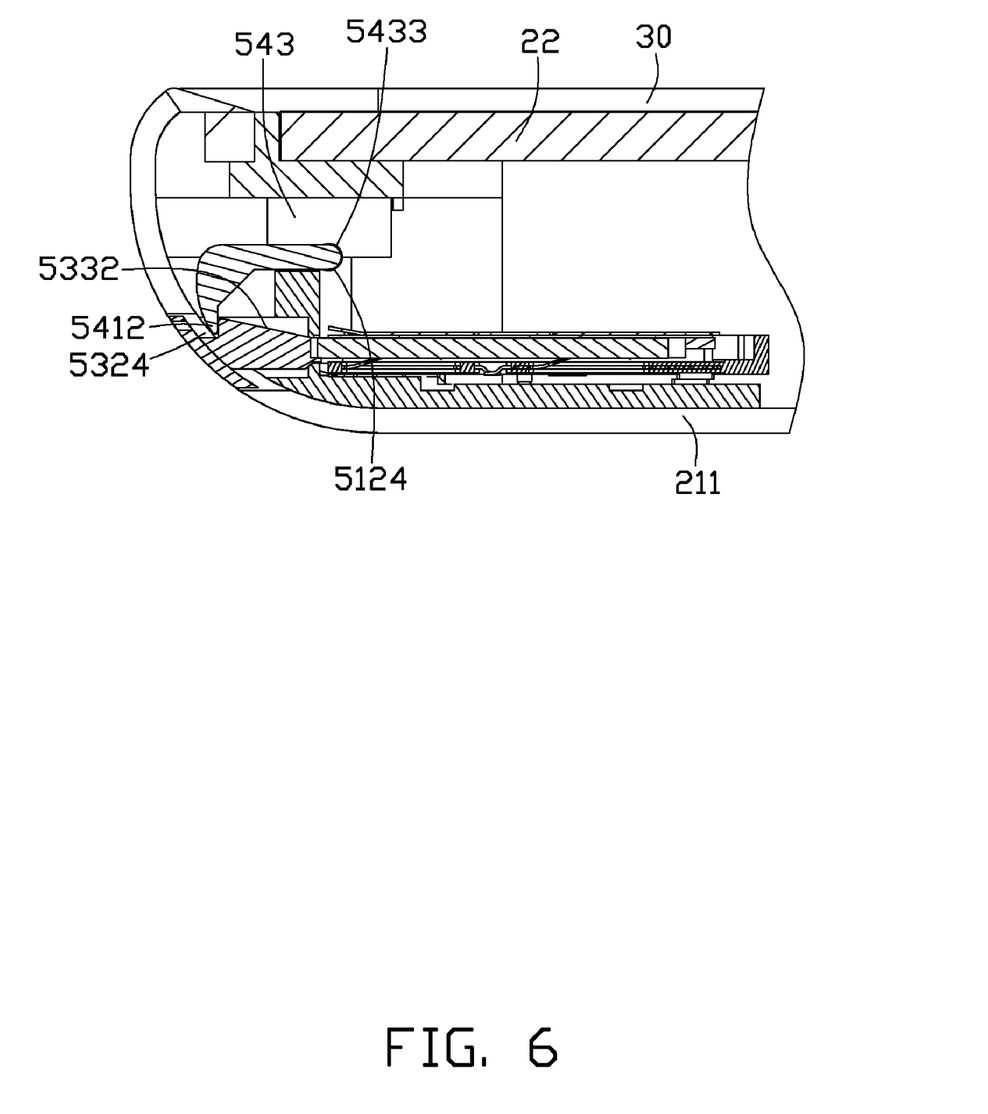
FIG. 6 is a partial, cross-section of the portable electronic device of FIG. 1, taken along line VI-VI.

Referring to FIGS. 4 through 6, the support bracket 52 is assembled on the main body 511. The support bracket 52 includes a top cover 521, a bottom cover 522, and a plurality of resilient members 523. The top cover 521 and the bottom cover 522 cooperatively define a substantially rectangular receiving space 524 with an opening 5227 at a side of the bottom cover 522 to receive the tray 53. The top cover 521 is substantially flat. The bottom cover 522 includes a bottom surface 5225, a plurality of electronic components (not labeled) electronically fitted on the bottom surface 5225, two opposite side walls 5221 and an abutting wall 5222 extending upward from three continuous edges of the bottom surface 5225. The abutting wall 5222 interconnects with the two opposite side walls 5221. The opening 5227 is formed at a side of the bottom cover 522 adjacent to the insertion opening 214. The two side walls 5221 are opposite to each other. Each of the side walls 5221 defines a sliding groove 5224 in the inner surface of the side walls 5221.

The tray 53 is slidably assembled in the sliding grooves 5224, such that the tray 53 can slide in or out of the receiving space 524 along the sliding grooves 5224. The middle portion of the abutting wall 5222 defines a rectangular receiving groove 5226 (see FIG. 4) and two latching grooves 5223 at the two opposite sides of the receiving groove 5226 communicating with the receiving groove 5226. In the illustrated embodiment, the resilient member 523 is an elastic sheet. The total number of resilient members 523 is two. The two resilient members 523 are received in the receiving groove 5226, with an end of each of resilient members 523 fixed in a corresponding latching groove 5223, the other end of each of the resilient member 523 extends out of the receiving groove 5226. In alternative embodiments, the number of the resilient members 523 can be only one, the resilient member 523 can be fixed on the abutting wall 5222 to be received in the receiving space 524, and the latching grooves 5223 and the receiving groove 5226 can be omitted.

The tray 53 is slidably mounted to the support bracket 52 via the opening 5227 and received in the receiving space 524. The tray 53 includes a supporting portion 531, a covering portion 532, and an urging portion 533. The urging portion 533 is formed at an end of the supporting portion 531. The covering portion 532 is formed at an end of the urging portion 533 apart from the supporting portion 531. The transitional region of the urging portion 533 and the covering portion 532 forms an elongated groove 5324 (see FIG. 6). The supporting portion 531 is substantially rectangular. The supporting portion 531 defines a rectangular groove 5311 corresponding to the shape of the chip card 40 to hold the chip card 40. The center of the bottom surface of the rectangular groove 5311 defines a rectangular through hole 534 to allow the chip card 40 to be electronically connected with the other electronic components. The tray 53 further includes two flanges 5315 extending out from two opposite outer side surfaces of the supporting portion 531 corresponding to the sliding grooves 5224. The two flanges 5315 can be received in the sliding grooves 5224 respectively. The urging portion 533 is substantially a wedge. The urging portion 533 includes a slanted surface 5332 and a latching surface 5335 connected with the covering portion 532. The shape of the covering portion 532 is similar to the insertion opening 214. When the tray 53 is received in the support bracket 52, the covering portion 532 can be received in the insertion opening 214 covering the insertion opening 214 tightly. The covering portion 532 defines an unlocking hole 5323 (see FIG. 7) communicating with the elongated groove 5324.

The latching assembly 54 is assembled on the enlarged end 512 of the base seat 51. The latching assembly 54 includes a latching member 541 and a fixing member 543. The latching member 541 includes a pivot 5410 and a latching hook 5412 connected with the center of the pivot 5410. The fixing member 543 includes a fixing board 5431 and two convex stages 5432 fixed to a bottom surface of the fixing board 5431 separately. Each of the convex stages 5432 defines a pivoting groove 5433 (see FIG. 6). The pivoting groove 5433 and the arcuate groove 5124 cooperatively defining a hole to rotatably fix the pivot 5410.

In assembly, the base seat 51 is assembled on the bottom housing 21, with the engaging hole 5123 communicating with the insertion opening 214. Then, the support bracket 52 is assembled on the base seat 51, with the opening 5227 communicating with the engaging hole 5123. The latching member 541 is assembled on the enlarged end 512, and the pivot 5410 is correspondingly engaged in the arcuate groove 5124. The supporting member 22 is fixed on the bottom housing 21, with the stepped hole 223 communicating with the insertion opening 214. The fixing member 543 is then fixed on the supporting member 22, the two end portions 5431 fixed on the two second stepped surfaces 224 respectively. At this time, the two pivoting grooves 5433 and the arcuate groove 5124 cooperatively define a hole to fix the pivot 5410, and the latching hook 5412 can be rotatably moved in the pivoting grooves 5433. Finally, the tray 53 with the chip card 40 received in the tray 53 is inserted into the support bracket 52, with the two flanges 5315 correspondingly engaging in the two sliding grooves 5224. The tray 53 is pushed toward the abutting wall 5222 until the latching hook 5412 engages in the elongated groove 5324 with an end of the latching hook 5412 resisting the latching surface 5335. At this time, an end of the supporting portion 531 apart from the covering portion 532 resists the resilient member 523. The tray 53 is tightly locked in the support bracket 52.

To release the chip card 40 from the tray 53, a tool, such as a small cylindrical bar can be inserted into the unlocking hole 5323 and pushes the latching hook 5412 toward the resilient member 523. Then, the latching hook 5412 is rotated until the latching hook 5412 is unlocked from the elongated groove 5324. At this time, the resilient member 523 is in an elastically deformed state, and when the latching hook 5412 is released, the elastic force of the resilient member 523 is also released and pushes the tray 53 with the chip card 40 partly out of the support bracket 52.

In summary, when the chip card 40 is received in the holding mechanism 50, the tray 53 is tightly fixed in the support bracket 52 with an end of the tray 53 engaged with the latching member 541 and the other end of the tray 53 resisting the resilient member 523. The chip card 40 is tightly fixed in the tray 53 and is electronically connected with the electronic components, thereby making a sturdy connection of the chip card 40 with the electronic components. The chip card 40 can be easily ejected out of the holding mechanism 50 with the help of a tool, such as a round bar, and this can thereby protect the chip card 40 from faulty operation. Furthermore, the holding mechanism 50 is not connected with the bottom housing 21, and the holding mechanism 50 does not affect the appearance of the housing 20.

It is believed that the present embodiments and their advantages will be understood from the foregoing description, and it will be apparent that various changes may be made thereto without departing from the spirit and scope of the embodiments or sacrificing all of its material advantages.

What is claimed is:
1. A portable electronic device, comprising:
   a housing defining an insertion opening;
   a chip card holding mechanism inserted into the insertion opening and received in the housing comprising:
   a base seat comprising a main body and an enlarged end at an end of the main body;
      a support bracket fixed on the base seat, the support bracket comprising a bottom cover, the bottom cover comprising a bottom surface, two side walls and an abutting wall extending upward from three continuous edges of the bottom surface, and the bottom surface, the two side walls and the abutting wall cooperatively defining a receiving space with an opening apart from the abutting wall;
      a resilient member fixed on the abutting wall;
      a latching assembly comprising a latching member, the latching member comprising a pivot and a latching hook connecting with the center of the pivot;
      a tray comprising a supporting portion, a covering portion, an urging portion, an elongated groove formed in the transitional region of the urging portion and the covering portion, a rectangular groove formed in the supporting portion to receive a chip card, and the tray is received in the receiving space locked in the elongated groove engageably by the latching hook and resists the resilient member.

2. The portable electronic device of claim 1, wherein the abutting wall defines a receiving groove and two latching grooves at the sides of the receiving groove, one end of the resilient member fixed in one of the latching groove and the other end of the resilient member extending out of the receiving groove.

3. The portable electronic device of claim 1, wherein the enlarged end comprises a top surface parallel with the main body and a side surface connected with the top surface, the top surface defines an arcuate groove at an end of the top surface adjacent to the main body to fix the latching assembly, and the side surface defines an engaging hole adjacent to the main body.

4. The portable electronic device of claim 3, wherein the chip card holding mechanism is fixed on the bottom housing, with the engaging hole communicating with the insertion opening.

5. A chip card holding mechanism, comprising:
a base seat comprising a main body and an enlarged end at an end of the main body;
a support bracket fixed on the base seat, the support bracket comprising a bottom cover, the bottom cover comprising a bottom surface, two side walls and an abutting wall extending upward from three continuous edges of the bottom surface, and the bottom surface, the two side walls and the abutting wall cooperatively defining a receiving space with an opening apart from the abutting wall;
a resilient member fixed on the abutting wall;
a latching assembly comprising a latching member, the latching member comprising a pivot and a latching hook connecting with the center of the pivot;
a tray comprising a supporting portion, a covering portion, an urging portion, an elongated groove formed in the transitional region of the urging portion and the covering portion, a rectangular groove formed in the supporting portion to receive a chip card, and the tray is received in the receiving space by the latching hook engageably locked in the elongated groove and resists the resilient member.

6. The chip card holding mechanism of claim 5, wherein the abutting wall defines a receiving groove and two latching grooves at the sides of the receiving groove, one end of the resilient member fixed in one of the latching groove and the other end of the resilient member extending out of the receiving groove.

7. The chip card holding mechanism of claim 5, wherein each of the side walls of the bottom cover of the support bracket defines a sliding groove in the inner surface of the side walls, two flanges extends out from the outer side of two opposite edges of the supporting portion corresponding to the sliding grooves.

8. The chip card holding mechanism of claim 5, wherein the center of the bottom surface of the rectangular groove defines a through hole.

9. The chip card holding mechanism of claim 5, wherein the urging portion further comprises a latching surface, and the latching hook engaged in the elongated groove by resisting the latching surface.

10. The chip card holding mechanism of claim 5, wherein the covering portion defines an unlocking hole communicating with the elongated groove.

11. The chip card holding mechanism of claim 5, wherein the latching assembly further comprises a fixing member, the fixing member comprises two convex stages at the opposite ends of the fixing member, each of the convex stages defines a pivoting groove to assemble the pivot correspondingly.

12. The chip card holding mechanism of claim 5, wherein the supporting bracket further comprises a top cover, the top cover and the bottom cover cooperatively define a rectangular receiving space with the opening to receive the tray.

13. The chip card holding mechanism of claim 5, wherein the enlarged end comprises a top surface parallel with the main body and a side surface connected with the top surface, the top surface defines an arcuate groove at an end of the top surface adjacent to the main body to fix the latching assembly, and the side surface defines an engaging hole adjacent to the main body.

14. The chip card holding mechanism of claim 13, wherein in the center of the top surface forms a restriction surface to stop the rotation of the latching assembly.

15. A chip card holding mechanism, comprising:
a support bracket defining a receiving space with an opening;
one or more resilient members fixed in the support bracket;
a latching assembly rotatably positioned adjacent to the opening of the support bracket; and
a tray defining a rectangular groove to receive a chip card, wherein the tray is slidably mounted to the support bracket via the opening, and the tray is received in the receiving space engaged by the latching assembly and resisting the resilient member.

16. The chip card holding mechanism of claim 15, wherein the tray comprises a supporting portion, an urging portion formed at an end of the supporting portion corresponding to the opening, the urging portion defines an elongated groove thereon, the latching assembly comprises a fixing member and a latching member rotatably assembled on the fixing member, and the latching member is locked with the urging portion.

17. The chip card holding mechanism of claim 16, wherein the urging portion comprises a slanted surface connecting with the supporting portion and a latching surface connecting with the slanted surface; the latching member comprises a pivot and a latching hook connected to the center of the pivot, and the latching hook engages with the latching surface.

18. The chip card holding mechanism of claim 16, wherein the tray further comprises a covering portion at an end of the urging portion apart from the supporting portion, the transitional region of the urging portion and the covering portion form an elongated groove engaged with the latching hook.

19. The chip card holding mechanism of claim 16, wherein the support bracket comprises a bottom cover, the bottom cover includes a bottom surface, two opposite side walls and an abutting wall extending upward from three continuous edges of the bottom surface, each of the side walls defines a sliding groove in the inner surface of the side walls, and the tray further comprises two flanges extending out from two opposite outer side surfaces of the supporting portion corresponding to the sliding grooves.

20. The chip card holding mechanism of claim 18, wherein the covering portion defines an unlocking hole communicating with the elongated groove.

* * * * *

UNITED STATES PATENT AND TRADEMARK OFFICE
CERTIFICATE OF CORRECTION

PATENT NO. : 8,371,878 B2  
APPLICATION NO. : 13/171697  
DATED : February 12, 2013  
INVENTOR(S) : Zi-Ming Tang

Page 1 of 1

It is certified that error appears in the above-identified patent and that said Letters Patent is hereby corrected as shown below:

On the title page insert the following:

--(30)   Foreign Application Priority Data  
November 30, 2010   (CN) ..........................2010 1 0566415--

Signed and Sealed this  
Twenty-sixth Day of November, 2013

Margaret A. Focarino  
*Commissioner for Patents of the United States Patent and Trademark Office*